(12) United States Patent
Ikehata

(10) Patent No.: US 8,388,298 B2
(45) Date of Patent: Mar. 5, 2013

(54) APPARATUS FOR AUTOMATICALLY CORRECTING A POSITIONAL DEVIATION OF A LOAD

(75) Inventor: Yoshiteru Ikehata, Shiga (JP)

(73) Assignee: Daifuku Co., Ltd. (JP)

(*) Notice: Subject to any disclaimer, the term of this patent is extended or adjusted under 35 U.S.C. 154(b) by 1002 days.

(21) Appl. No.: 11/775,395

(22) Filed: Jul. 10, 2007

(65) Prior Publication Data

US 2008/0025831 A1  Jan. 31, 2008

(30) Foreign Application Priority Data

Jul. 31, 2006 (JP) .................................. 2006-207308

(51) Int. Cl.
  *B65G 47/24* (2006.01)

(52) U.S. Cl. ........................................................ 414/779

(58) Field of Classification Search .................. 82/170; 29/271; 414/754, 777, 936, 757, 781, 784, 414/269, 217, 222.04, 222.05, 222.06, 589, 414/668, 671, 672, 677, 749.6, 778, 779, 414/782; 269/903, 317, 289 R; 74/128; 65/182.1
See application file for complete search history.

(56) References Cited

U.S. PATENT DOCUMENTS

| | | | | |
|---|---|---|---|---|
| 676,423 | A * | 6/1901 | Craven ........................... 414/754 |
| 2,422,430 | A * | 6/1947 | Manderscheid et al. ....... 451/338 |
| 2,483,932 | A * | 10/1949 | Powell ............................ 434/131 |
| 3,069,762 | A * | 12/1962 | Sonnier ............................ 29/271 |
| 3,170,232 | A * | 2/1965 | Craver ............................. 29/271 |
| 3,434,602 | A * | 3/1969 | Vann ............................... 414/784 |
| 3,466,514 | A * | 9/1969 | Brunner et al. ................ 318/577 |
| 3,753,505 | A * | 8/1973 | Ouska ............................ 414/778 |
| 3,937,344 | A * | 2/1976 | Montgomery et al. ........ 414/469 |
| 3,993,200 | A * | 11/1976 | Ide ............................... 414/140.8 |
| 4,096,958 | A * | 6/1978 | Stobb ............................. 414/800 |
| 4,106,647 | A * | 8/1978 | Robert ........................... 414/816 |
| 4,125,919 | A * | 11/1978 | Dumont ....................... 24/136 R |
| 4,177,682 | A * | 12/1979 | Blackman ........................ 74/128 |
| 4,258,928 | A * | 3/1981 | Wiesler ......................... 279/133 |
| 4,319,863 | A * | 3/1982 | Voges ............................ 414/480 |
| 4,360,313 | A * | 11/1982 | Satzler ........................... 414/781 |
| 4,826,421 | A * | 5/1989 | Asano et al. ................ 425/403.1 |
| 4,948,330 | A * | 8/1990 | Nomura et al. ................ 414/754 |
| 5,033,928 | A * | 7/1991 | Suominen ...................... 414/277 |
| 5,484,252 | A * | 1/1996 | Mutoh ........................... 414/783 |
| 5,533,243 | A * | 7/1996 | Asano .......................... 29/25.01 |

(Continued)

FOREIGN PATENT DOCUMENTS

JP    H5-37755    5/1993

*Primary Examiner* — Saul Rodriguez
*Assistant Examiner* — Glenn Myers
(74) *Attorney, Agent, or Firm* — St. Onge Steward Johnston & Reens LLC

(57) ABSTRACT

A load positioning apparatus includes a movable table that is urged and held at a forward limit position by a movable-table urging element, a load-supporting roller that allows the load to laterally move on a horizontal surface, and a load-positioning roller that is supported on the movable table and adjoins the side face of the load supported in the fixed position on the load supporting roller. The urging element allows the table to recede together with the load-positioning roller when a load is vertically lowered at a position where the load-positioning roller is pushed outwardly with respect to the fixed position. The urging element has an urging force sufficient to return the movable table to the forward limit position so as to push back the load to the fixed position via the load positioning roller.

15 Claims, 12 Drawing Sheets

U.S. PATENT DOCUMENTS

| | | | | |
|---|---|---|---|---|
| 5,722,810 A | * | 3/1998 | Young et al. | 414/563 |
| 5,778,798 A | * | 7/1998 | VanDenberg | 105/215.2 |
| 6,222,339 B1 | * | 4/2001 | Yamasaki et al. | 318/685 |
| 6,412,768 B1 | * | 7/2002 | Peckham et al. | 269/203 |
| 6,435,807 B1 | * | 8/2002 | Todorov et al. | 414/757 |
| 6,739,824 B2 | * | 5/2004 | Dupuy et al. | 414/546 |
| 7,169,346 B2 | * | 1/2007 | Johns et al. | 264/320 |
| 7,393,124 B1 | * | 7/2008 | Williams | 362/431 |

\* cited by examiner

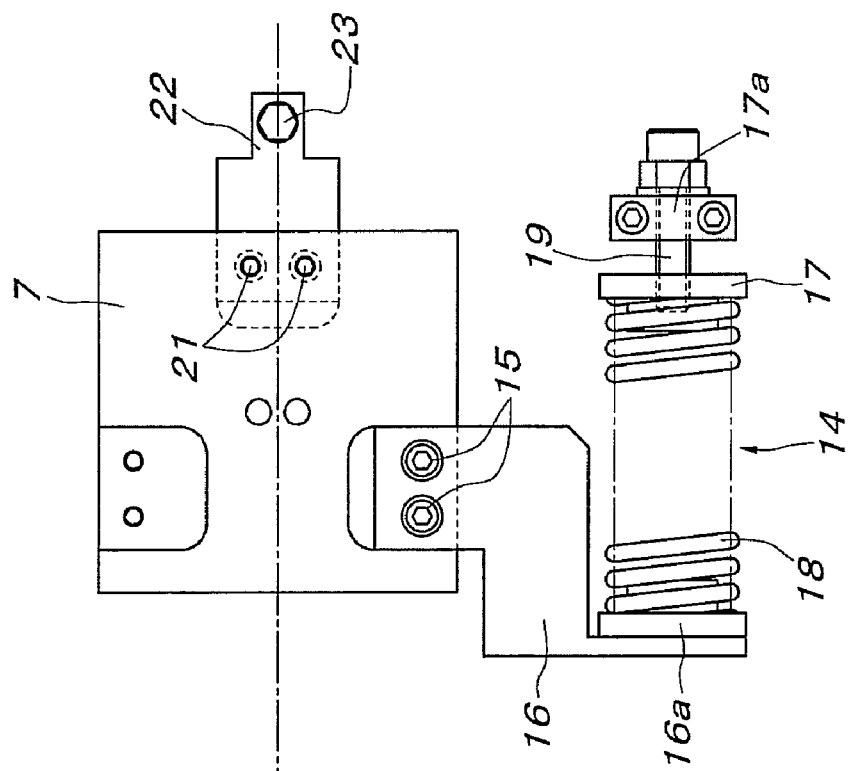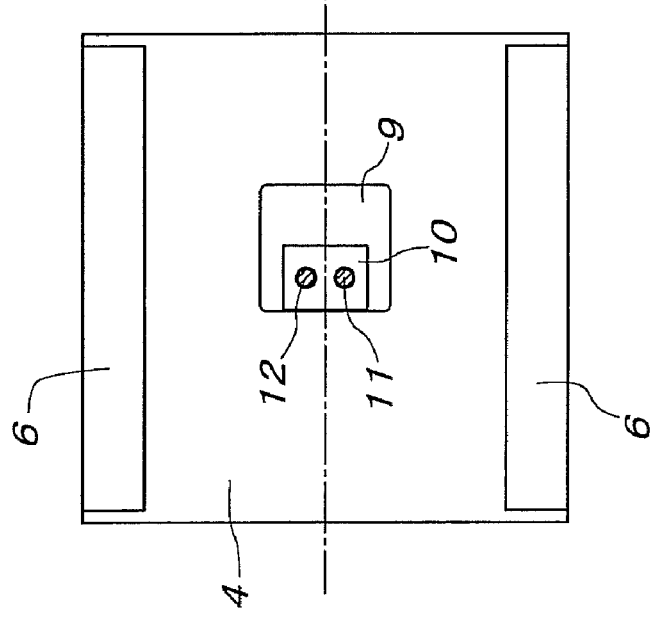
FIG. 3A
FIG. 3B

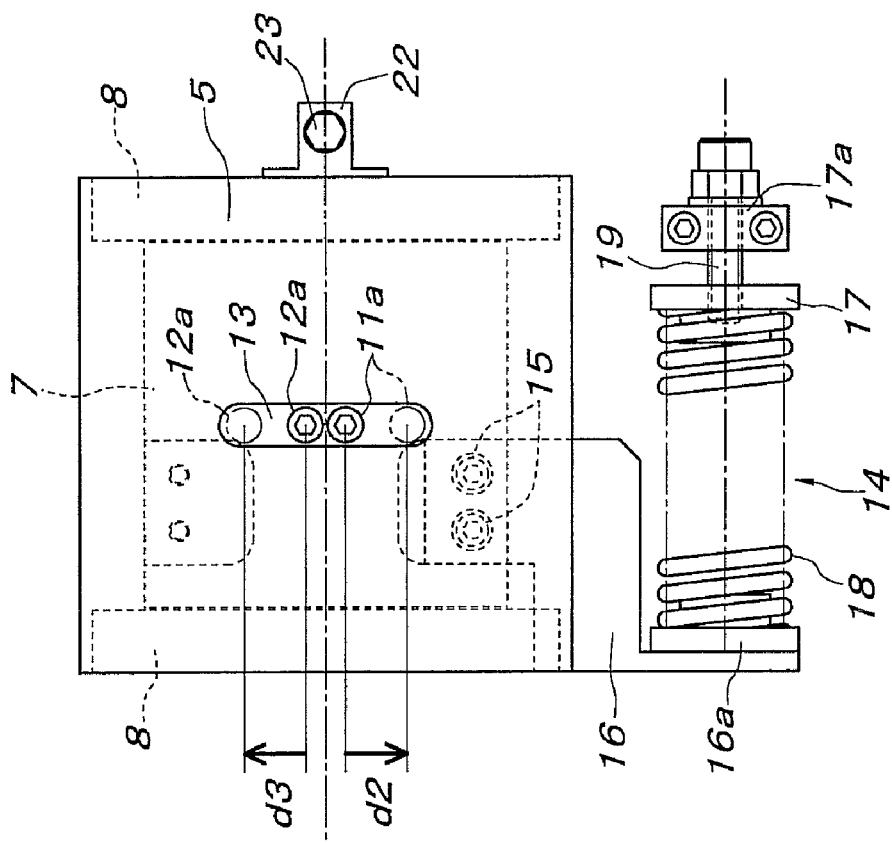
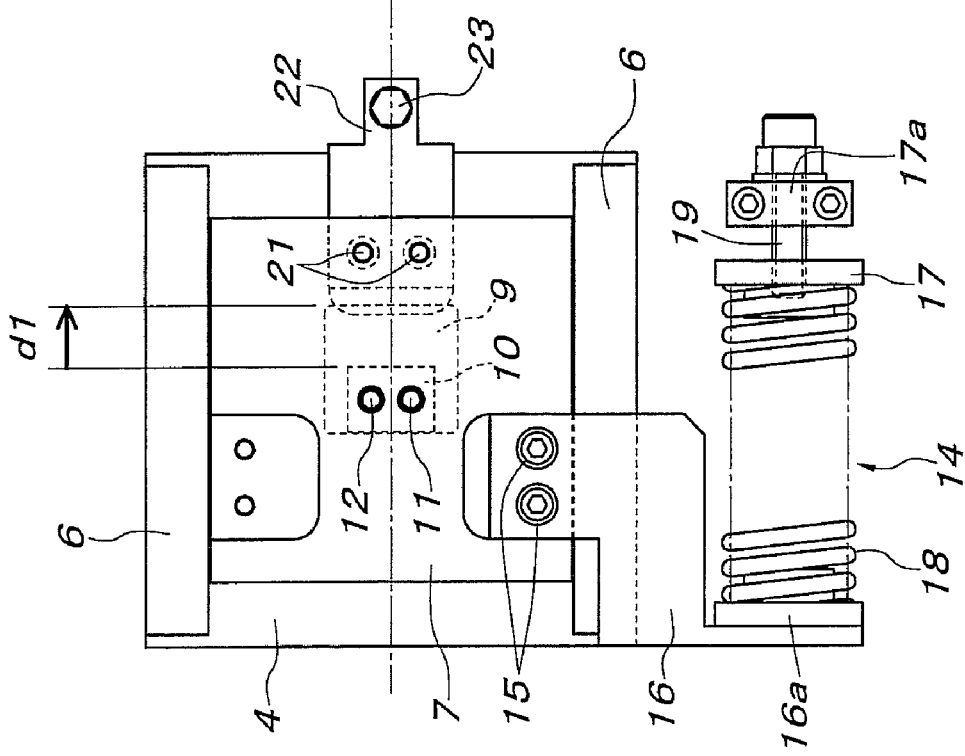
FIG. 4A
FIG. 4B

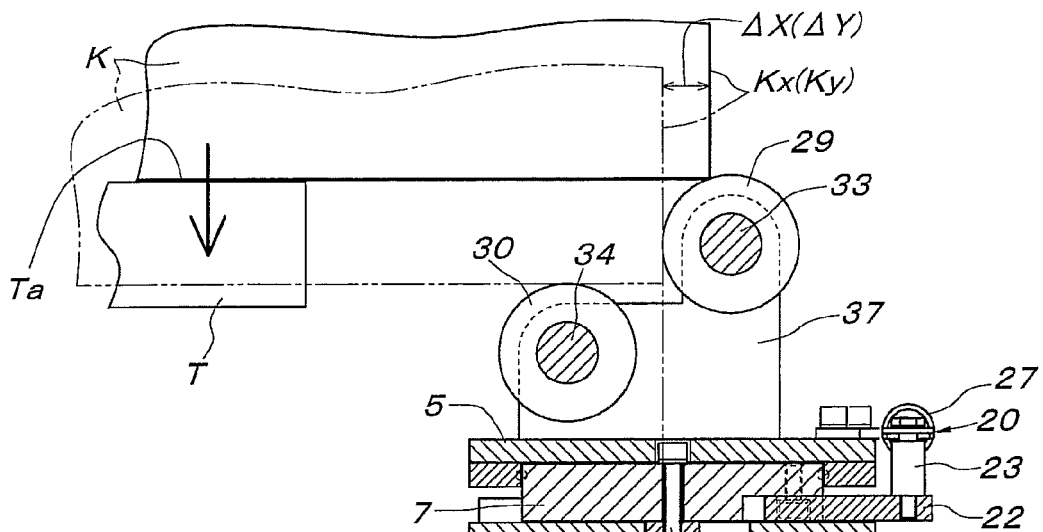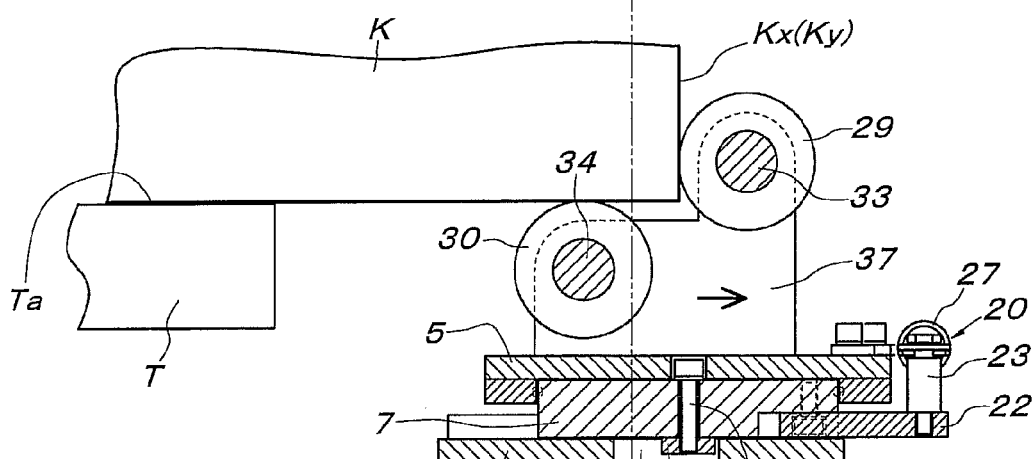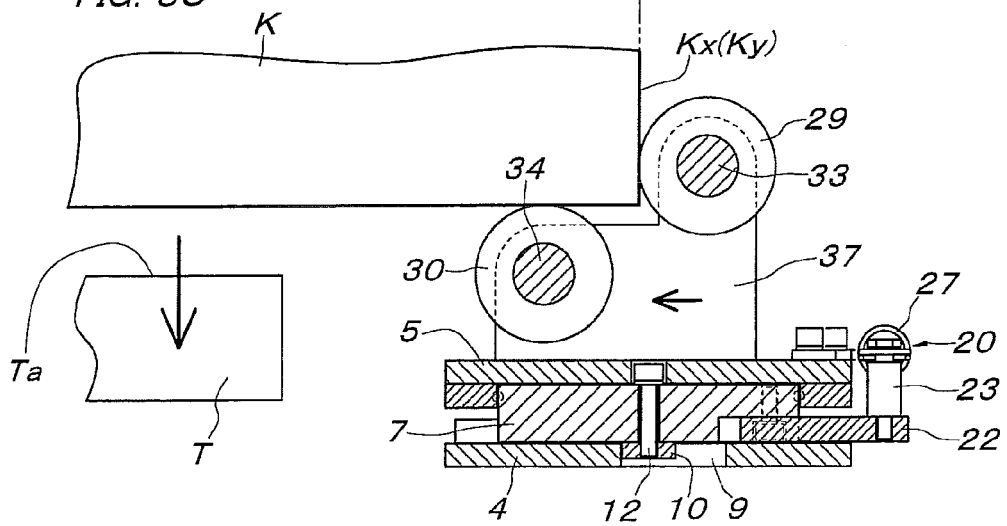

APPARATUS FOR AUTOMATICALLY CORRECTING A POSITIONAL DEVIATION OF A LOAD

FIELD OF THE INVENTION

This invention relates to a load positioning apparatus capable of being used as a means for automatically correcting a positional deviation in a horizontal direction of a cassette containing thin sheet-like substrates such as glass plates or wafers, which are stacked in layers, with respect to a predetermined fixed position when the cassette is vertically lowered onto a supporting board of a processing stage.

BACKGROUND OF THE INVENTION

When thin sheet-like substrates, such as glass plates or wafers, are conveyed to each processing stage, a cassette containing these substrates, which are stacked in layers, is used. This cassette is lowered by a transfer apparatus onto a supporting board disposed at a substrate-taking-out position of each processing stage. The substrates contained in the cassette are then taken out by a substrate-taking-out robot provided beside the supporting board, and are supplied to a processing position. The substrate-taking-out robot is automatically controlled, and hence, in order to allow the robot to reliably and smoothly take the substrates out of the cassette without exerting an excessive force on the substrates, the accuracy of the posture or position of the cassette transferred onto the supporting board disposed at the substrate-taking-out position must be made sufficiently high. Therefore, a cassette-deviation automatic correction apparatus used to automatically correct positional deviations in horizontal two-dimensional directions of the cassette vertically lowered by the transfer apparatus is provided on the supporting board at the substrate-taking-out position to which the cassette is transferred. Examples of conventional load-positioning apparatuses that can be used for such a cassette-deviation automatic correction apparatus include an apparatus that needs a driving source and that is of a type that pushes a load, which has been lowered on the supporting board while being kept in a positionally deviated state, toward a fixed position by use of a pusher driven by a driving means and an apparatus that does not need a driving source and that is of a type that drives a pusher (roller) that pushes a load toward a fixed position by use of the weight of the load vertically lowered by a transfer apparatus as disclosed by Japanese Published Unexamined Utility Model Application No. H5-37755.

A plurality of load positioning apparatuses that differ from each other in a deviation correcting direction must be disposed around the supporting board to which the cassette is lowered by the transfer apparatus. Therefore, if the cassette-deviation automatic correction apparatus is composed of the load positioning apparatuses of the type that needs a driving source, a pusher driven by a driving means is required for each of the load positioning apparatuses disposed at a plurality of positions around the supporting board to which the cassette is lowered by the transfer apparatus. Since a control device is additionally required for the driving means, an extremely high equipment cost must be paid for the entire cassette-deviation automatic correction apparatus, and there is a high possibility that control system trouble will cause a breakdown. On the other hand, if the cassette-deviation automatic correction apparatus is composed of the load positioning apparatuses of the type that does not need a driving source, it will be possible to resolve the problem occurring when the load positioning apparatuses of the type that needs a driving source are used. However, the motion of, for example, an up-and-down movable lever depressed by a cassette lowered vertically while being supported by the transfer apparatus is converted into a pushing motion of the pusher (roller) pushing the descending cassette toward the fixed position, and hence the cassette descending while being supported by the transfer apparatus is horizontally moved on a supporting surface of the transfer apparatus. However, in recently-used facilities that handle a large-sized, enormously-heavy (about 1000 Kg) cassette that contains large-sized glass plates, the heavy cassette cannot be horizontally and smoothly moved on the supporting surface of the transfer apparatus, and hence such facilities cannot employ the load positioning apparatus structured as above.

SUMMARY OF THE INVENTION

It is an object of the present invention to provide a load positioning apparatus that can solve the conventional problem mentioned above. The load positioning apparatus of the present invention includes a movable table that can move in horizontal, forward and backward directions within a predetermined range, a movable-table urging means for urging and holding the movable table at a forward limit position, a load supporting portion that supports a bottom face of a load lowered vertically and that allows the load to laterally move on a horizontal surface, and a load positioning roller that is supported on the movable table by a horizontal supporting shaft perpendicular to a moving direction of the movable table 5 and that adjoins a vertical surface of the load supported in a fixed position on the load supporting portion. In the thus structured load positioning apparatus, the movable-table urging means allows the movable table to recede together with the load positioning roller when the load supported by a transfer apparatus is vertically lowered at a position overlapping with the load positioning roller with respect to the fixed position when taking a plan view, whereas the movable-table urging means has an urging force great enough to return the movable table to the forward limit position so as to push the load backwardly to the fixed position by use of the load positioning roller when the load is supported by the load supporting portion and when the transfer apparatus moves away from the load.

According to the thus structured load positioning apparatus of the present invention, if a load lowered vertically while being supported by the transfer apparatus is deviated to the side overlapping with the load positioning roller with respect to the fixed position when taking a plan view, the load allows the movable table to recede by use of the load positioning roller while resisting the urging force of the movable-table urging means. Therefore, the load never laterally moves on the supporting surface of the transfer apparatus. When the load is supported on the load supporting portion, and the transfer apparatus moves away from the load, i.e., when the weight of the load is received by the load supporting portion, the movable table returns to the forward limit position together with the load positioning roller by receiving the urging force of the movable-table urging means, and the load is pushed by the load positioning roller and is laterally moved to the fixed position during this process, thus correcting a positional deviation in the moving direction of the movable table (i.e., in the forward and backward directions).

In other words, in the load positioning apparatus of the present invention, if a load is deviated to the side overlapping with the load positioning roller with respect to the fixed position when taking a plan view, the load is temporarily lowered onto the load supporting portion without changing the deviated state, and then the load is allowed to proceed to the fixed position by the urging force of the urging means by use of the load positioning roller, thus correcting a positional deviation of the load. Therefore, according to the load positioning apparatus of the present invention, a driving means (a driving source) is not required to forwardly move the load positioning roller to the fixed position, and hence low production costs can be achieved, and, in addition, there is no need to laterally slide the load on a supporting surface on the side of the transfer apparatus to lower the load to the fixed position. Therefore, even if the load is enormously heavy, the load can be handled without any difficulty.

If the load positioning apparatus of the present invention is used for the centering of a load relative to one (e.g., an X direction) of the horizontal two-dimensional directions, the load positioning apparatuses of the present invention are arranged for both sides in the X direction of the load. If the load positioning apparatus of the present invention is used for the centering of a load relative to both (e.g., an X direction and a Y direction) of the horizontal two-dimensional directions, the load positioning apparatuses of the present invention are arranged for both sides in the X direction of the load and for both sides in the Y direction of the load. In these two cases, the movable table and the load positioning roller of the load positioning apparatus, which is one of those load positioning apparatuses and which lies on the side where the load is deviated from the fixed position, operate as above, so that the load is moved in a direction in which the movable table proceeds, i.e., toward the fixed position so as to correct a positional deviation of the load. On the other hand, in the load positioning apparatus on the opposite side, the vertical surface of the load to undergo a positional-deviation correction as above approaches the load positioning roller. The vertical surface in the X direction of the load or the vertical surfaces in the X and Y directions of the load whose positional deviation has been corrected adjoin the load positioning roller on the movable table held at the forward limit position by the urging force of the urging means, and the load is positioned.

Preferably, to carry out the present invention having the above-mentioned structure, the load supporting portion is formed so that a load supported by this portion can smoothly move in the lateral direction. Therefore, the load supporting portion can be formed of, for example, a floating unit having a supporting board that can freely move in the horizontal two-dimensional directions or a supporting board to which a material that is small in frictional resistance against the bottom face of a cassette has been attached. Although the load supporting portion can be disposed on a fixed base that supports the movable table at a position apart from the movable table, it is preferable to provide the load supporting portion on the movable table in accordance with the structure of a second aspect of the present invention.

According to the structure of the second aspect of the present invention, the number of attachment elements to be attached to the fixed base becomes smaller than a case in which the load supporting portion that supports a load vertically lowered by the transfer apparatus is disposed on the fixed base supporting the movable table away from the movable table. Therefore, the entire apparatus can be made more compact, and an apparatus installing operation can become easier, and hence a reduction in production costs can be achieved. Even if the load supporting portion is provided on the movable table, another load supporting portion can, of course, be provided on the fixed base away from the movable table so as to serve as an auxiliary element when a load to be handled has a large plane size or when this load is heavy.

If the structure of the second aspect of the present invention is employed, the load supporting portion can be formed of a load supporting roller supported by a horizontal supporting shaft perpendicular to the forward and backward moving directions of the movable table, as in a third aspect of the present invention.

According to the structure of the third aspect of the present invention, when the load positioning apparatus of the present invention is used for the centering of a load, the slip resistance of a load to undergo a positional-deviation correction becomes small on the load supporting portion of the load positioning apparatus toward which the load moves. Even if this load is enormously heavy, the centering operation can be smoothly performed, and it is also helpful in reducing the urging force of the urging means.

If the load supporting portion is formed of rollers, the load positioning apparatus can further include a movable lever, a stopper, and a movable-lever urging means, as in a fourth aspect of the present invention. The movable lever has its intermediate part supported so as to be able to seesaw on the movable table by an operation of a horizontal shaft parallel to the load positioning roller. The load positioning roller is supported at an end of the movable lever, and the load supporting roller is supported at an opposite end of the movable lever. The stopper restricts a seesawing range of the movable lever between a supporting posture in which the load supporting roller is positioned at a load supporting level and in which the load positioning roller is contiguous to a vertical surface of the load supported at the fixed position on the load supporting roller and a tilted posture in which the load supporting roller projects from the load supporting level upwardly. The movable-lever urging means urges and holds the movable lever in the tilted posture.

According to the structure of the fourth aspect of the present invention, even if the positional deviation amount of a load toward the load positioning roller is the same, a relative contact movement amount between the load lowered while being in a deviated state and the load-positioning roller becomes enormously smaller than a case in which the position on the movable table of the load positioning roller is fixed. Therefore, the circumferential surface of the load positioning roller or the load can be prevented from being worn out, and dust can be prevented from occurring as a result of the abrasion. Additionally, even if the diameter of the load positioning roller is not enlarged, an allowable load positional deviation amount that enables an easy entrance into the inside of the load positioning roller can be made great. Still additionally, the load supporting roller can also be used as a depressing roller serving as an actuator that is needed to return the load positioning roller to an initial position (i.e., position contiguous to the vertical surface of the load in the fixed position) by use of the gravity of the descending load. Therefore, the number of apparatus elements can be controlled not to rise.

If the load positioning apparatus of the present invention is used for the centering of a load relative to both (X and Y directions) of the horizontal two-dimensional directions as described above, the vertical surface of the load moves along the axial center direction of the roller with respect to the load positioning roller in the load positioning apparatuses on both sides in the Y direction (or X direction) when the positional deviation of the load is corrected by the load positioning apparatuses on both sides in the X direction (or Y direction). Therefore, if the load positioning apparatus of the present invention is used for the centering of a load relative to both (X and Y directions) of the horizontal two-dimensional directions, the movable table is supported movably both in horizontal forward and backward directions and in horizontal rightward and leftward directions within a predetermined range, and is provided with a second movable-table urging means for centering the movable table to occupy a center position within a moving range in horizontal, rightward and leftward directions, and the second movable-table urging means has such a degree of urging force as to allow the movable table to move in the horizontal, rightward and leftward directions together with the load supported on the load supporting portion, as in a fifth aspect of the present invention.

According to the structure of the fifth aspect of the present invention, in a load positioning apparatus, which is one of the load positioning apparatuses of the present invention and for which a load moves in horizontal, rightward and leftward directions (i.e., axial center direction of the load positioning roller) with respect to the movable table when the positional deviation of the load is corrected, the movable table can laterally move together with the load in the horizontal, rightward and leftward directions by use of the load supporting portion. Therefore, a relative movement in the horizontal, rightward and leftward directions can be eliminated between the load-supporting portion and the load, and the load positioning roller or the load can be prevented from being worn out resulting from the relative movement in the horizontal, rightward and leftward directions of the load, and dust can be prevented from occurring as a result of the abrasion even if the load supporting portion is formed of a stationary plane on the movable table (for which a surface material that lessens the slip resistance of the load is used, of course) or is formed of a load supporting roller parallel to the load positioning roller as described above. Preferably, in particular, the structure of the fifth aspect of the present invention is combined with the structure of the third aspect of the present invention.

If the structure of the fifth aspect of the present invention is employed, the movable-table urging means and the second movable-table urging means can be made up of a pair of right and left springs symmetrically obliquely stretched between the movable table and a movable-table supporting board, as in a sixth aspect of the present invention. Of course, in this case, a pinch angle between both springs is set so that the urging force toward the forward limit position given to the movable table by the pair of right and left springs becomes sufficiently greater than the urging force for centering in the lateral, right and left directions given to the movable table by the pair of right and left springs.

According to the structure of the sixth aspect of the present invention, the pair of right and left springs stretched symmetrically obliquely can be used as both of the movable-table urging means and the second movable-table urging means. Therefore, a reduction in costs can be achieved by making the structure simple.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 3A is a transverse sectional plan view of a platform, and FIG. 3B is a plan view showing an intermediate movable body and a movable-table urging means.

FIG. 4A is a transverse sectional plan view directly under a movable table, and

FIG. 4B is a plan view in which attached elements on the movable table have been removed.

FIGS. 8A, 8B, and 8C are explanatory drawings for explaining a modification of a structure for supporting a load positioning roller and a load supporting roller, FIG. 8A being a longitudinal sectional side view showing a state immediately before a descending cassette presses and moves the load positioning roller rearwardly, FIG. 8B being a longitudinal sectional side view showing a state in which the descending cassette is supported by the load supporting roller, FIG. 8C being a longitudinal sectional side view showing a state in which the cassette supported by the load supporting roller has undergone a positional-deviation correction.

DETAILED DESCRIPTION OF THE INVENTION

Figure 1A:
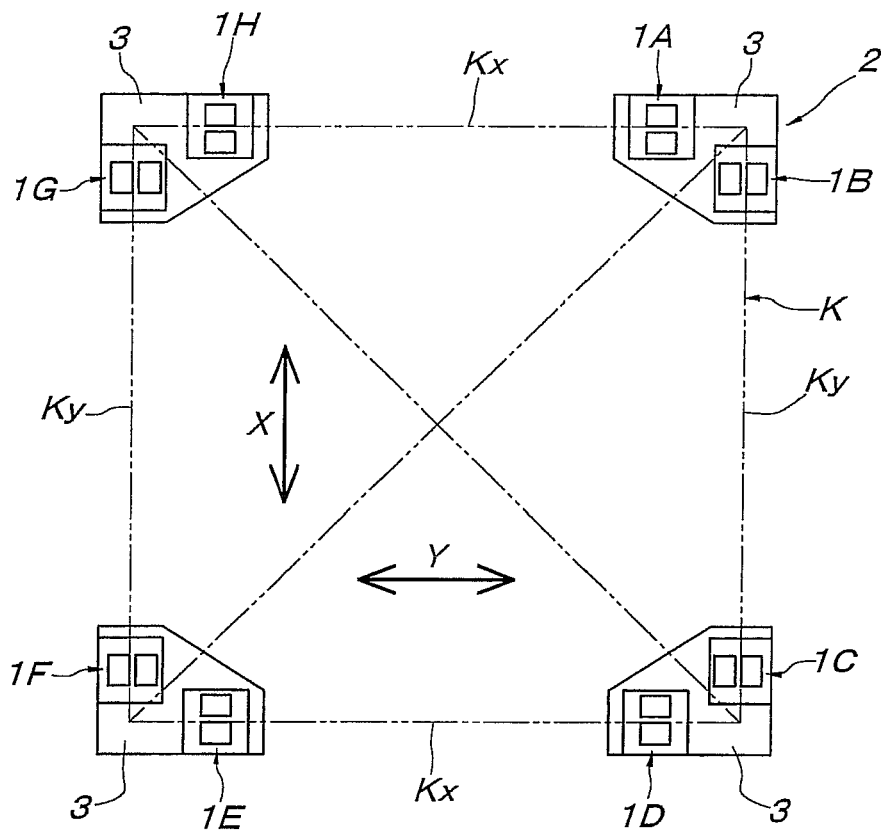
FIGS. 1A and 1B schematically show a cassette-deviation automatic correction apparatus composed of load positioning apparatuses of the present invention, FIG. 1A being a plan view, FIG. 1B being an enlarged plan view of a main part of FIG. 1A.
Figure 1B:
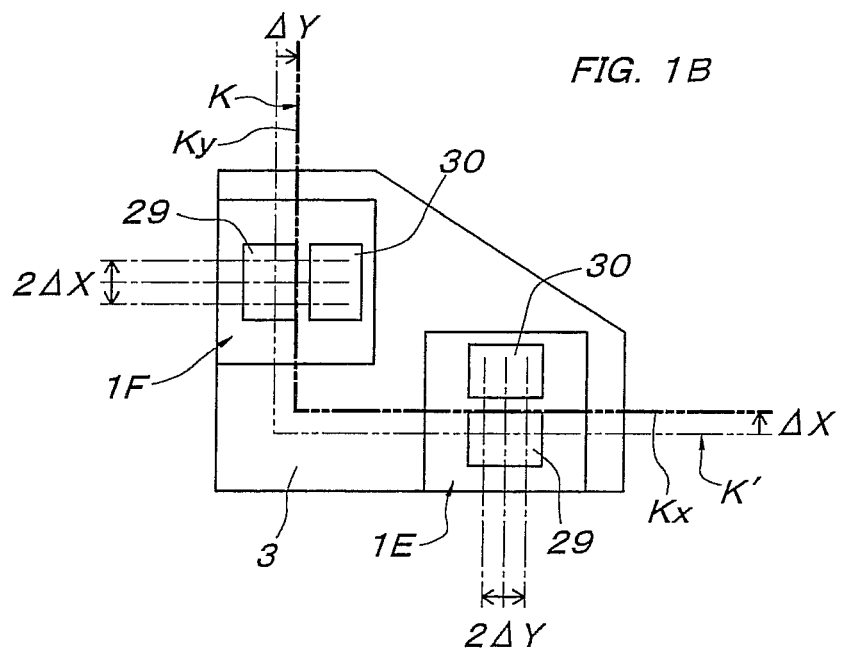
Figure 2A:
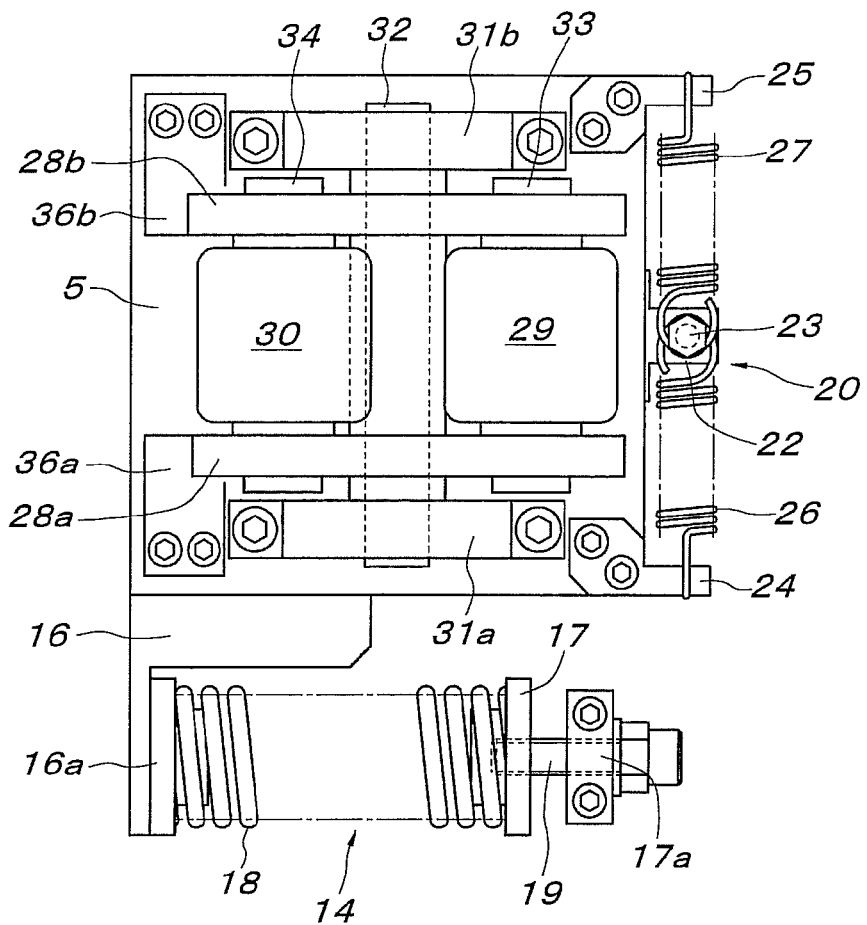
FIGS. 2A and 2B show an embodiment of the load positioning apparatus of the present invention, FIG. 2A being a plan view, FIG. 2B being a partially longitudinal sectional side view.
Figure 2B:
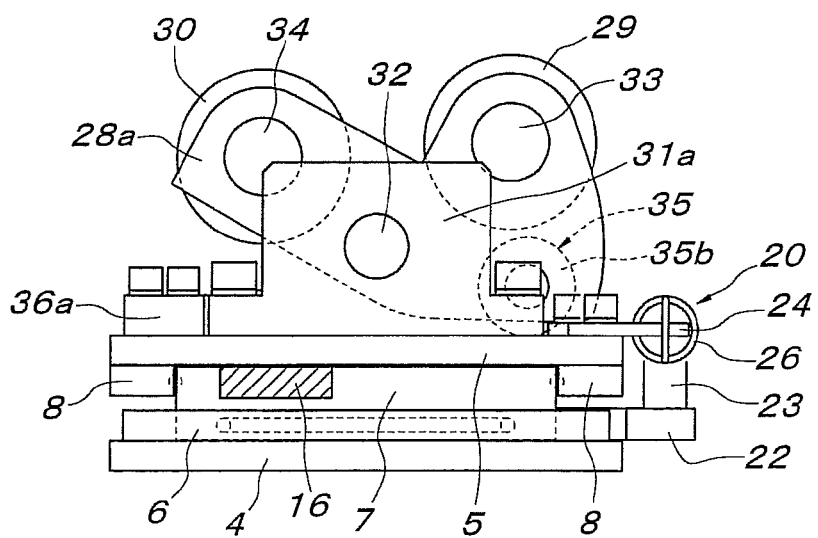

In FIGS. 1A and 1B, reference characters 1A to 1H designate load positioning apparatuses, respectively, according to the present invention. These load positioning apparatuses constitute a cassette-deviation automatic correction apparatus 2 that automatically corrects positional deviations of a cassette K vertically lowered to a substrate-taking-out position (cassette-supporting portion) by a transfer apparatus with respect to horizontal two-dimensional directions, i.e., with respect to both an X direction and a Y direction. The load positioning apparatuses 1A to 1H are the same in structure, and are disposed in groups of two at four fixed bases 3 corresponding to four corners, respectively, of the bottom face of the cassette K in a fixed position shown by a phantom line in FIGS. 1A and 1B so as to meet external vertical surfaces Kx and Ky, which cross at right angles, of the cassette K. In FIG. 1B, another phantom line drawn at a distance outside the cassette K placed in the fixed position designates a cassette-lowered area K' in which the cassette K is outwardly away from the fixed position by maximum allowable positional deviation amounts ΔX and ΔY (ΔX=ΔY).

Accordingly, positional deviations in the X direction of the cassette K lowered into the cassette-lowered area K' are corrected by the load positioning apparatuses 1A and 1H or the load positioning apparatuses 1D and 1E that are disposed on both sides in the X direction, whereas positional deviations in the Y direction of the cassette K are corrected by the load positioning apparatuses 1B and 1C or the load positioning apparatuses 1F and 1G that are disposed on both sides in the Y direction. At this time, the cassette K relativity moves in the X direction within a range that is twice the maximum allowable positional deviation amount ΔX on the load positioning apparatuses on both sides in a direction perpendicular to a deviation correcting direction, i.e., on the load positioning apparatuses 1B and 1C and the load positioning apparatuses 1F and 1G on both sides in the Y direction when positional deviations in the X direction are corrected, whereas the cassette K relativity moves in the Y direction within a range that is twice the maximum allowable positional deviation amount ΔY on the load positioning apparatuses 1A and 1H and the load positioning apparatuses 1D and 1E on both sides in the X direction when positional deviations in the Y direction are corrected.

As shown in FIG. 2A to FIG. 6, each of the load positioning apparatuses 1A to 1H has a movable table 5 supported horizontally movably in a forward, backward, rightward, or leftward direction on a flat rectangular platform 4 disposed on the fixed base 3 of FIGS. 1A and 1B. A means for supporting and guiding the movable table 5 with respect to the platform 4 is made up of a pair of right and left guide rails 6 that are attached to the upper side of the platform 4 and that are extended forwardly and backwardly, an intermediate movable body 7 supported horizontally movably only in a forward or backward direction between the guide rails 6, and a pair of front and back guide rails 8 that are attached to the underside of the movable table 5 and between which the intermediate movable body 7 is sandwiched. The movable table 5 can forwardly or backwardly move along the guide rails 6 together with the intermediate movable body 7, and can move along the guide rails 8 rightwardly or leftwardly with respect to the intermediate movable body 7. Linear bearings, not shown in detail, are interposed between the guide rails 6 and the intermediate movable body 7 and between the intermediate movable body 7 and the guide rails 8, so that the movable table 5 can horizontally, lightly, and smoothly move in a forward, backward, rightward, or leftward direction with respect to the platform 4.

The platform 4 has an opening 9 shaped like a rectangle. A rectangular member 10 loosely fitted in the opening 9 passes through the intermediate movable body 7 in upward and downward directions, and is fixed to the bottom face of the intermediate movable body 7 with two bolts 11 and 12 arranged side by side in rightward and leftward directions. On the other hand, the movable table 5 has a long hole 13 that is long in the rightward and leftward directions and that is wide so that heads 11a and 12a of the two bolts 11 and 12, respectively, are loosely fitted therein relatively movably only in the rightward and leftward directions. Therefore, as shown in FIG. 4A, the movable table 5 can move back and forth together with the intermediate movable body 7 with respect to the platform 4 only in a forward-and-backward movement allowable range d1 between a forward limit position where the rectangular member 10 comes into contact with the front side of the opening 9 and a backward limit position where the rectangular member 10 comes into contact with the rear side of the opening 9, and, as shown in FIG. 4B, can move right and left with respect to the platform 4 and the intermediate movable body 7 only in rightward and leftward movement allowable ranges d2 and d3 from a state in which the bolt heads 11a and 12a are located at the center in the long hole 13 to a state in which the bolt heads 11a and 12a reach the ends of the long hole 13 in the rightward and leftward directions, respectively. The forward-and-backward movement allowable range d1 and the rightward and leftward movement allowable ranges d2 and d3 are each substantially equal to outward maximum allowable positional deviation amounts ΔX and ΔY (ΔX=ΔY) of the cassette K shown in FIG. 1B.

Reference numeral 14 designates a movable-table urging means that is made up of an arm member 16 that is fixed to right and left sides of the intermediate movable body 7 with bolts 15 and that extends from between the platform 4 and the movable table 5 toward the lateral side, a fixed-side spring bearing seat 17 that faces a spring bearing seat 16a provided at the free end of the arm member 16, and a helical compression spring 18 interposed between the spring bearing seats 16a and 17 in the horizontal, forward and backward direction. As shown in FIG. 4A, the movable-table urging means urges and holds the movable table 5 at the forward limit position where the rectangular member 10 comes into contact with the front side of the opening 9. The fixed-side spring bearing seat 17 is supported on the side of the fixed base 3 shown in FIGS. 1A and 1B by use of a supporting member 17a and an adjusting bolt 19. An initial compressive stress of the helical compression spring 18 can be adjusted by allowing the adjusting bolt 19 to make a positional adjustment in the forward and backward directions. It is permissible to form the platform 4 into oblong shape and provide the fixed-side spring bearing seat 17 on this platform 4, or alternatively, it is permissible to separately provide an attachment plate used to attach the platform 4 and the fixed-side spring bearing seat 17 and fix this attachment plate to the fixed base 3.

Figure 6:
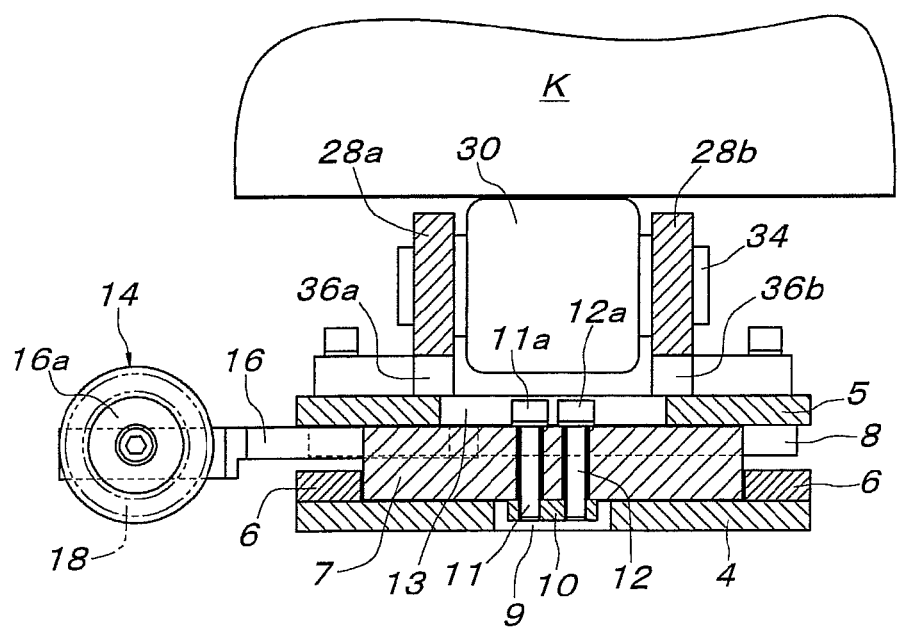
FIG. 6 is a longitudinal sectional rear view in which a load supporting roller has been lowered to a supporting level.

Reference numeral 20 designates a second movable-table urging means that is made up of an arm member 22 that is fixed to the rear side of the intermediate movable body 7 with bolts 21 and that extends from between the platform 4 and the movable table 5 backwardly, a spring fastening shaft 23 erected at the free end of the arm member 22 upwardly, a pair of right and left spring fastening pieces 24 and 25 that are fixed with bolts to the right and left ends, respectively, of the rear side of the movable table 5 and that extend backwardly, and a pair of right and left helical extension springs 26 and 27 that are stretched in the lateral, right and left directions between the spring fastening piece 24 and the spring fastening shaft 23 and between the spring fastening piece 25 and the spring fastening shaft 23, respectively. As shown in FIG. 4B and FIG. 6, the movable table 5 is urged and held by the tensile force of the helical extension springs 26 and 27 at a centering position (i.e., a centering position relative to the intermediate movable body 7) where the bolt heads 11a and 12a on the side of the intermediate movable body 7 are located at the center of the long hole 13 of the movable table 5.

Figure 5:
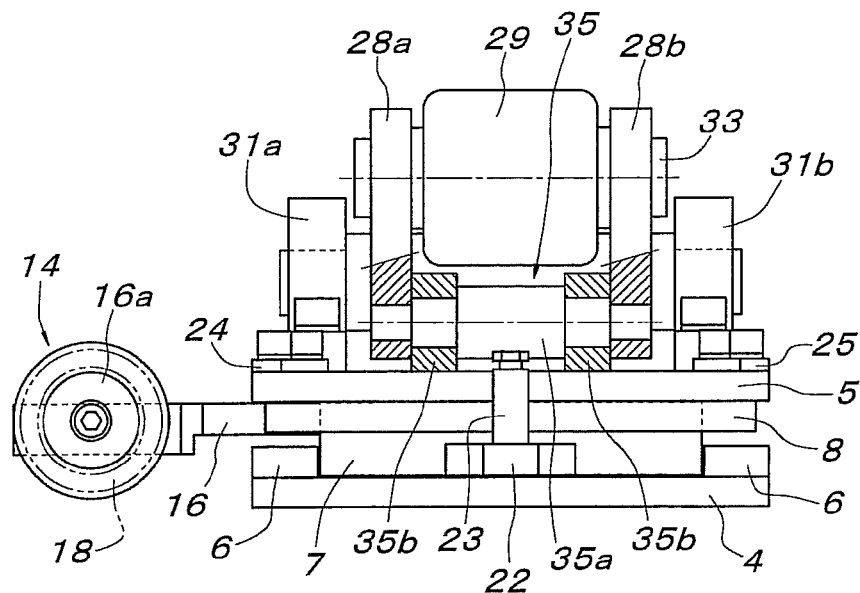
FIG. 5 is a rear view, partially longitudinal sectional view, in which a helical extension spring of a second movable-table urging means has been removed.

A load positioning roller 29 and a load supporting roller 30 are provided above the movable table 5 with a pair of right and left movable levers 28a and 28b. The movable levers 28a and 28b are formed substantially in the shape of the capital letter L when viewed from the side. The intermediate part of each of the movable levers 28a and 28b is pivotably supported by a horizontal supporting shaft 32 extending rightwardly and leftwardly so that this part can seesaw between a pair of right and left bearing plates 31a and 31b erected on the movable table 5. The load positioning roller 29 is pivotably supported between the rear upper ends of the movable levers 28a and 28b by a horizontal supporting shaft 33 extending rightwardly and leftwardly. The load supporting roller 30 is pivotably supported between the front ends of the movable levers 28a and 28b by a horizontal supporting shaft 34 extending rightwardly and leftwardly. As shown in FIG. 5, a horizontal shaft 35a that is used for a weight and that serves as the movable-lever urging means 35 is provided between the rear lower ends of the movable levers 28a and 28b. A pair of right and left rings 35b that are made of elastic material and that come into contact with the upper surface of the movable table 5 are fitted to the horizontal shaft 35a. A pair of right and left stopper members 36a and 36b are fixed to the upper surface of the movable table 5 with bolts. The stopper members 36a and 36b catch the lower surfaces of the front ends of the movable levers 28a and 28b when the movable levers 28a and 28b are tilted in a direction resisting the urging force of the movable-lever urging means 35 (i.e., in a direction in which the load supporting roller 30 descends).

Figure 7A:
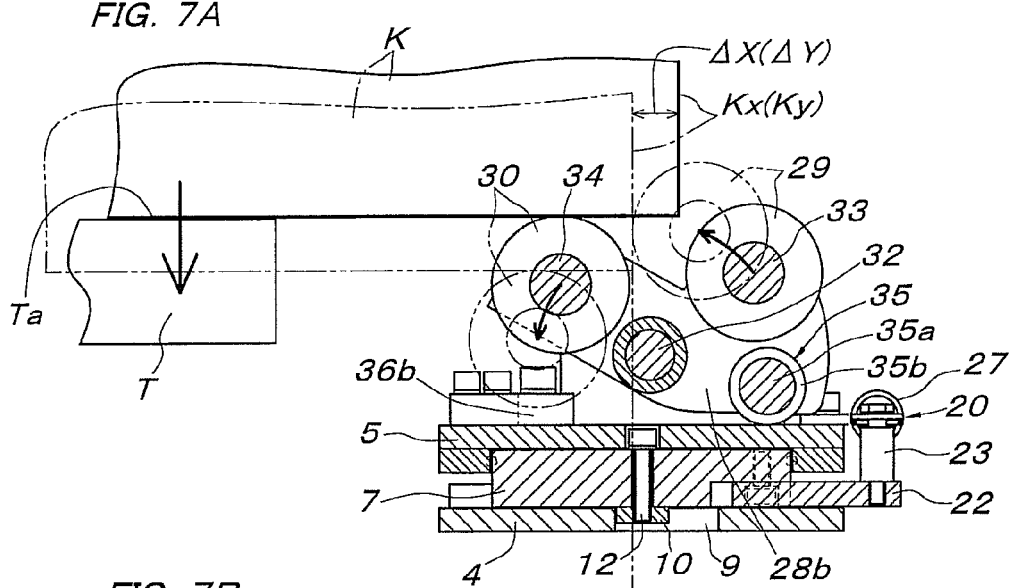
FIGS. 7A, 7B, and 7C are explanatory drawings for explaining an operation, FIG. 7A being a longitudinal sectional side view showing a state immediately before a descending cassette depresses a load supporting roller, FIG. 7B being a longitudinal sectional side view showing a state in which the descending cassette is supported by the load supporting roller, FIG. 7C being a longitudinal sectional side view showing a state in which the cassette supported by the load supporting roller has undergone a positional-deviation correction.
Figure 7B:
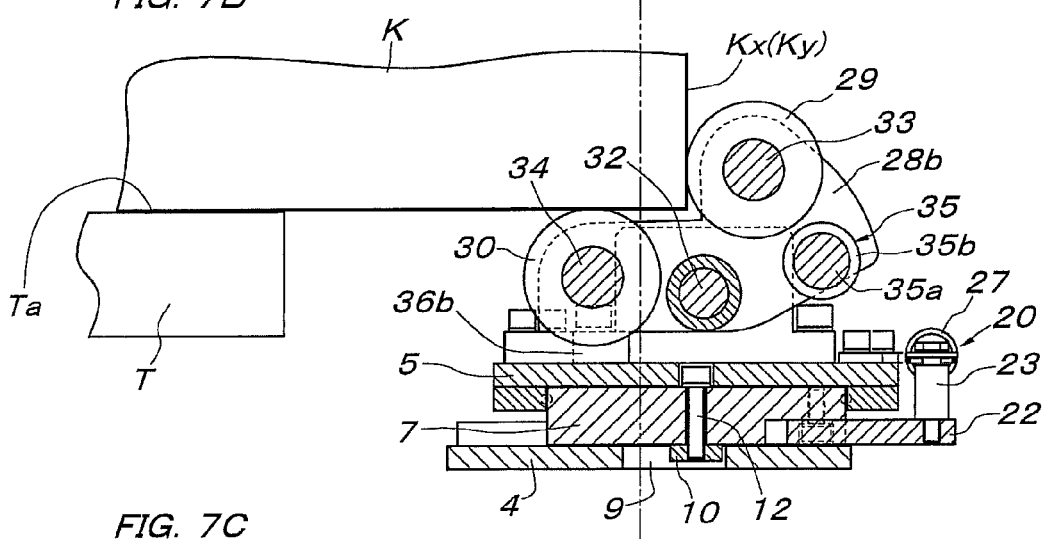
Figure 7C:
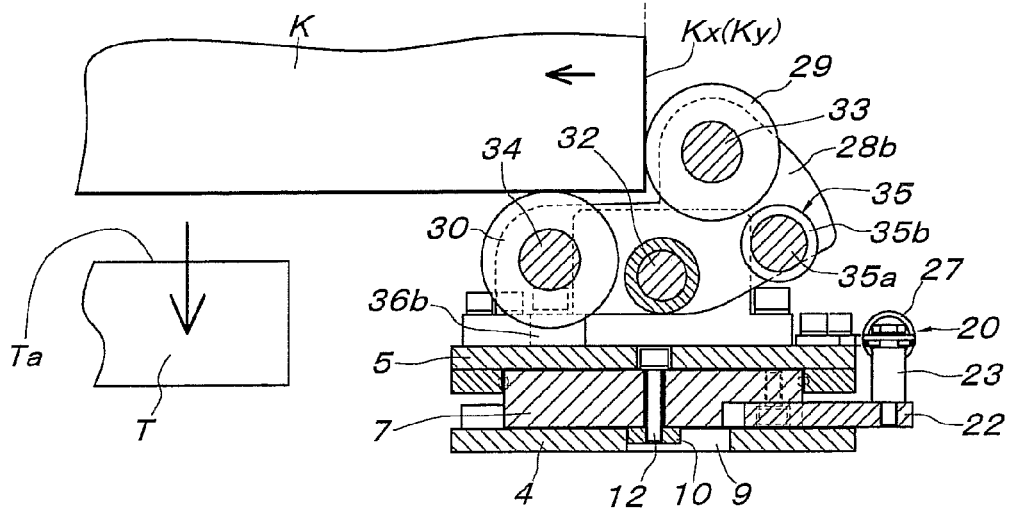

Accordingly, when the movable levers 28a and 28b are tilted in a direction resisting the urging force of the movable-lever urging means 35, so that the lower surfaces of the front ends of the movable levers 28a and 28b are caught by the stopper members 36a and 36b as shown in FIG. 7C, the load positioning roller 29 is moved upwardly, and is adjoined to the side face of the cassette K placed in the fixed position, and the load supporting roller 30 takes a supporting posture to support the cassette K at the cassette supporting level. Therefore, when the movable levers 28a and 28b are tilted in a direction in which the urging force of the movable-lever urging means 35 acts (i.e., in a direction in which the load supporting roller 30 descends), and take a tilted posture in which the ring 35b of the horizontal shaft 35a is caught by the upper surface of the movable table 5 as shown in FIG. 7A, the load positioning roller 29 recedes more backwardly and more downwardly than the position occupied when the movable levers 28a and 28b take the supporting posture of FIG. 7C, and the load supporting roller 30 projects more upwardly than the position occupied when the movable levers 28a and 28b take the supporting posture of FIG. 7C, i.e., more upwardly than the cassette supporting level.

The thus structured load-positioning apparatus, which is used as each of the load positioning apparatuses 1A to 1H shown in FIG. 1, is provided so that the load positioning roller 29 adjoins both external vertical surfaces Kx in the X direction of the cassette K placed in the fixed position and both external vertical surfaces Ky in the Y direction thereof, whereas the load supporting roller 30 supports the bottom face of the cassette K placed in the fixed position when the movable levers 28a and 28b are tilted in a direction resisting the urging force of the movable-lever urging means 35 so as to be switched to a supporting posture in a state in which the movable table 5 is urged and held at the forward limit position by the urging force of the movable-table urging means 14. Therefore, a direction in which the movable table 5 recedes while resisting the urging force of the movable-table urging means 14 coincides with a direction in which the load positioning roller 29 recedes from the external vertical surfaces Kx and Ky of the cassette K, whereas a direction in which the movable table 5 proceeds according to the urging force of the movable-table urging means 14 coincides with a direction in which the load positioning roller 29 approaches the external vertical surfaces Kx and Ky of the cassette K.

Accordingly, if the position of the cassette K is deviated from the fixed position in both of or either of the X direction and the Y direction, any of the load positioning apparatuses 1A to 1H on which the cassette K lies outside the fixed position performs a positioning operation as follows when the cassette K supported by a cassette supporting table, which can move up and down, of the cassette transfer apparatus is vertically lowered into the cassette-lowered area K' of FIG. 1B.

In more detail, as shown in FIG. 7A, the cassette K supported by the up-and-down movable cassette supporting table T of the cassette transfer apparatus is lowered onto the load supporting roller 30 of the load positioning apparatus being in a state in which the movable table 5 occupies the forward limit position and in a state in which the movable levers 28a and 28b take a tilted posture at a position where the cassette K lies outside the fixed position within the range of the maximum allowable positional deviation amount ΔX or ΔY. As a result, the front ends of the movable levers 28a and 28b are depressed by the cassette K through the operation of the load supporting roller 30, and the movable levers 28a and 28b are tilted around the horizontal supporting shaft 32 in a direction resisting the urging force of the movable-lever urging means 35, thus performing switching to a supporting posture in which the lower side faces of the front ends of the movable levers 28a and 28b are caught by the stopper members 36a and 36b. The load positioning roller 29 is rotated obliquely upwardly toward the external vertical surface Kx or Ky of the cassette K around the horizontal supporting shaft 32, and is brought into contact with the external vertical surface Kx or Ky of the cassette K in accordance with the tilt of the movable levers 28a and 28b at this time. However, the urging force of the movable-table urging means 14 (i.e., the repulsion force of the helical compression spring 18) is not great enough to press and move the cassette K supported by the cassette supporting table T of the transfer apparatus toward the fixed position by use of the load positioning roller 29 while resisting frictional resistance caused between the cassette K and a supporting surface Ta of the cassette supporting table T. Therefore, after the load positioning roller 29 comes into contact with the external vertical surface Kx or Ky of the cassette K, the movable table 5 recedes together with the movable levers 28a and 28b, the load positioning roller 29, and the load supporting roller 30 in accordance with the depression of the load supporting roller 30 by the cassette K as shown in FIG. 7B while resisting the urging force of the movable-table urging means 14.

In accordance with the tilt of the movable levers 28a and 28b to a supporting posture, the movable table 5 recedes outwardly in a state in which the load supporting roller 30 is in pressed contact with the bottom face of the cassette K when the movable table 5 recedes. At this time, the load supporting roller 30 rotates, and hence great resistance is not caused. Therefore, as shown in FIG. 7B, the movable levers 28a and 28b, whose front ends are depressed by the cassette K through an operation of the load supporting roller 30, reach a supporting posture and are caught by the stopper members 36a and 36b disposed on the movable table 5, and, in this state, the movable table 5 stops receding. At this time, the positional deviation of the cassette K is not corrected. Without changing the state of the positional deviation, the cassette K is supported by the fixed base 3 at a predetermined supporting level by use of the load supporting roller 30, the movable levers 28a and 28b, the stopper members 36a and 36b, the movable table 5, the intermediate movable body 7, and the platform 4 of each of the load positioning apparatuses 1A to 1H.

After the cassette K is supported at a predetermined supporting level while being positionally deviated as mentioned above, the cassette supporting table T of the transfer apparatus continuously descends, then moves away from the cassette K downwardly, and horizontally departs from the lower area of the cassette K toward the lateral side. The cassette supporting table T of the transfer apparatus moves away from the cassette K downwardly, and, as a result, a great frictional resistance caused between the cassette K and the supporting surface Ta of the cassette supporting table T of the transfer apparatus becomes absent. Therefore, the urging force of the movable-table urging means 14 (i.e., the repulsion force of the helical compression spring 18) surpasses the slip resistance in the back-and-forth movement direction of the movable table 5 supporting the cassette K at a predetermined supporting level through an operation of the load supporting roller 30. Therefore, the urging force of the movable-table urging means 14 can advance the movable table 5 located at a retreated position. At this time, the load positioning roller 29 and the load supporting roller 30 disposed on the movable table 5 also move forward together with the movable table 5, and, accordingly, the cassette K supported by the load supporting roller 30 is pressed and moved by the load positioning roller 29 toward the fixed position. Thereafter, the cassette K undergoes a positional-deviation correction, and is located in the fixed position when the movable table 5 reaches the forward limit position at which the rectangular member 10 placed on the side of the intermediate movable body 7 comes into contact with the front side of the opening 9 formed on the side of the platform 4 as shown in FIG. 7C.

The above-given description is concerned with the operation of the load positioning apparatus disposed on the side on which the cassette K is pressed and moved toward the fixed position so as to correct a positional deviation. In the load positioning apparatus disposed on the side of the moving direction of the cassette K pressed and moved toward the fixed position, the cassette K is lowered onto the load supporting roller 30 in a state in which the external vertical surface Kx or Ky of the cassette K lies inside the fixed position. Therefore, the load positioning roller 29 that stands up in accordance with the depression of the load supporting roller 30 by the cassette K and that moves toward the inside never comes into contact with the external vertical surface Kx or Ky of the cassette K. When the cassette K is pressed and moved toward the fixed position as mentioned above, the cassette K is smoothly moved while rolling the load supporting roller 30. When the cassette K reaches the fixed position, the external vertical surface Kx or Ky of the cassette K comes into contact with the load positioning roller 29. Therefore, the cassette K pressed and moved to the fixed position is finally sandwiched between the load positioning rollers 29 of the load positioning apparatuses located on both sides of the moving direction, and is held in the fixed position.

In the load positioning apparatuses disposed on both sides in a direction perpendicular to the moving direction of the cassette K toward the fixed position, the cassette K is moved in lateral, right and left directions on the load supporting roller 30 depressed to the supporting level along the direction of the axial center thereof when the cassette K is pressed and moved toward the fixed position. At this time, the movable table 5 supporting this load supporting roller 30 by use of the movable levers 28a and 28b can horizontally move within a predetermined range in the lateral, right and left directions with respect to the platform 4 (the intermediate movable body 7), and is merely centered by the second movable-table urging means 20 upon a central position within the moving range in the lateral, right and left directions. Therefore, when the cassette K horizontally moves on the load supporting roller 30 along the direction of the axial center thereof in the lateral, right and left directions, the whole of apparatus elements disposed on the movable table 5 including this movable table 5 horizontally moves together with the cassette K in the lateral, right and left directions through an operation of the load supporting roller 30 while resisting the urging force of the second movable-table urging means 20. Therefore, when the cassette K is pressed and moved toward the fixed position, the load positioning apparatuses disposed on both sides in the direction perpendicular to the moving direction thereof never act as a great resistance, and hence a positional-deviation correcting operation can be smoothly performed. Note that the movable table 5 horizontally moves together with the cassette K in the lateral, right and left directions with respect to the intermediate movable body 7, whereas the intermediate movable body 7 does not horizontally moves in the lateral, right and left directions. Therefore, no influence is exerted on the movable-table urging means 14 connected to the intermediate movable body 7.

FIGS. 8A, 8B, and 8C show a structure that can be employed, for example, when loads, such as cassettes K, to be dealt are relatively lightweight. According to this structure, the load positioning roller 29 and the load supporting roller 30 are fixedly disposed on the movable table 5. In more detail, the load positioning roller 29 and the load supporting roller 30 are supported by the horizontal supporting shafts 33 and 34, respectively, at the positions occupied when the movable levers 28a and 28b of the first embodiment mentioned above take a supporting posture (i.e., positions shown in FIGS. 7B and 7C) between a pair of right and left bearing plates 37 fixedly erected on the movable table 5. According to this structure, the cassette K vertically lowered at a position deviated outwardly from the fixed position directly pushes the load positioning roller 29 outwardly (i.e., in a direction in which the movable table 5 recedes), and is placed on the load supporting roller 30 while allowing the movable table 5 to recede against the urging force of the movable-table urging means 14.

Figure 9:
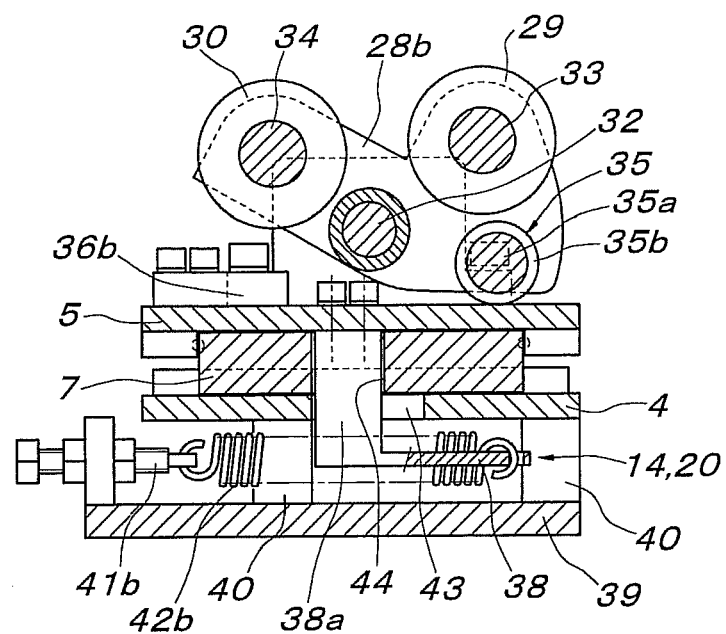
FIG. 9 is a longitudinal sectional side view showing a modification of the movable-table urging means.
Figure 10:
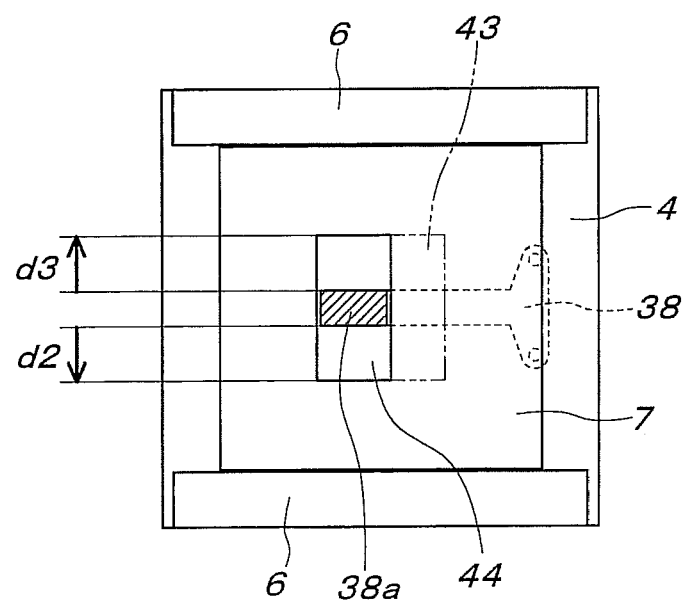
FIG. 10 is a partially transverse sectional plan view showing an intermediate movable body and a platform of the modification of FIG. 9.
Figure 11:
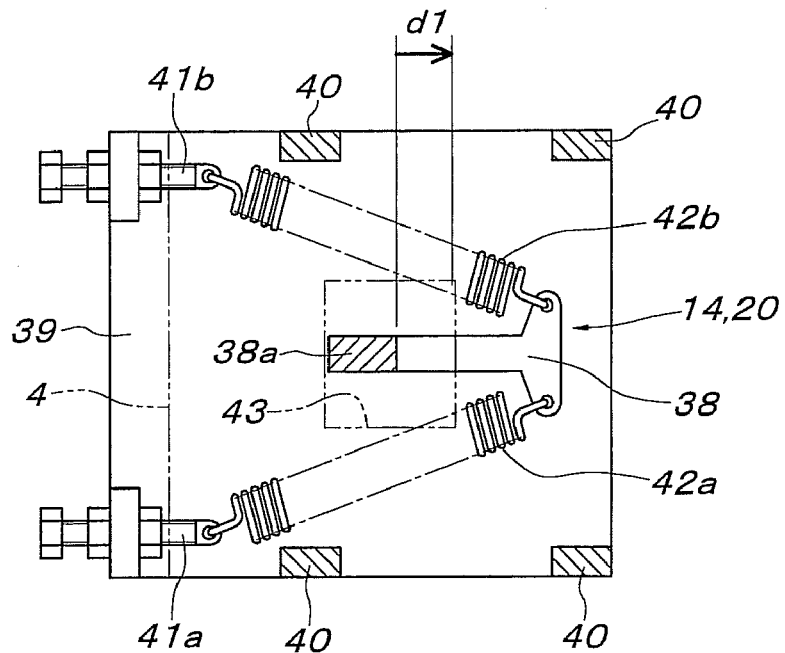
FIG. 11 is a transverse sectional plan view showing a movable-table urging means of the modification.

FIG. 9 to FIG. 11 show a modification concerning the movable-table urging means 14 and the second movable-table urging means 20. According to this structure, a spring-end fastening piece 38 having a pillar 38a that passes through the intermediate movable body 7 and the platform 4 in the up-down direction is fixed to the bottom face of the movable table 5 at the upper end of the pillar 38a. The platform 4 is fixedly supported on the attachment plate 39 with a plurality of neighboring connection members 40 between the platform 4 and the attachment plate 39. A pair of right and left helical extension springs 42a and 42b are stretched between the spring-end fastening piece 38 and a pair of right and left spring-end fastening bolts 41a and 41b attached to the front side of the attachment plate 39 by use of a space lying between the platform 4 and the attachment plate 39. The initial tensile stress of each of the helical extension springs 42a and 42b can be adjusted by adjusting the positions in the forward and backward directions of the spring-end fastening bolts 41a and 41b.

The pillar 38a of the spring-end fastening piece 38 passes through an opening 43 formed in the platform 4 and an opening 44 formed in the intermediate movable body 7. The opening 43 of the platform 4 has a planarly rectangular shape wide enough to allow the pillar 38a to relatively move in the forward, backward, rightward, and leftward directions as shown by the phantom line in FIG. 11. As shown in FIG. 10, the opening 44 of the intermediate movable body 7 is a laterally long hole in which the pillar 38a can relatively move only in the lateral, right and left directions. Therefore, the movable table 5 can move back and forth with respect to the platform 4 (the attachment plate 39) within the moving range in the forward and backward directions of the pillar 38a in the opening 43 on the side of the platform 4, and can move in the lateral, right and left directions with respect to the platform 4 (the intermediate movable body 7 and the attachment plate 39) within the moving range in the rightward and leftward directions of the pillar 38a in the opening 44 on the side of the intermediate movable body 7. The pair of right and left helical extension springs 42a and 42b become stable in bilateral symmetry in which they incline in mutually opposite directions by their tension when taking a plan view as shown in FIG. 11. At this time, the tension of the helical extension springs 42a and 42b chiefly urges the movable table 5 forwardly so as to hold this at the forward limit position where the pillar 38a comes into contact with the front side of the opening 43 on the side of the platform 4. Part of the tension of the helical extension springs 42a and 42b serves to center the movable table 5 so as to occupy a central position within the moving range in the lateral, right and left directions (i.e., the moving range in the rightward and leftward directions of the pillar 38a in the opening 44 on the side of the intermediate movable body 7).

In other words, according to the structure of FIG. 9 to FIG. 11, the pair of right and left helical extension springs 42a and 42b symmetrically obliquely interposed between the movable table 5 and the fixed side (i.e., the attachment plate 39) are used both as the movable-table urging means 14 that urges and holds the movable table 5 at the forward limit position and as the second movable-table urging means 20 that centers the movable table 5 so as to occupy a central position within the moving range in the lateral, right and left directions. The entire operation is the same as that of the foregoing embodiment, and hence a description thereof is omitted.

In the embodiments shown in FIG. 1 to FIG. 11, the movable table 5 is structured to be able to move not only in the forward and backward directions but also in the lateral, right and left directions, and there are provided the movable-table urging means 14 that urges and holds the movable table 5 at the forward limit position and the second movable-table urging means 20 that centers the movable table 5 so as to occupy a central position within the moving range in the lateral, right and left directions. Without being limited to this, the movable table 5 may be structured to be able to move only in the forward and backward directions, for example, when loads (e.g., cassettes K) to be dealt are each lightweight.

Figure 12:
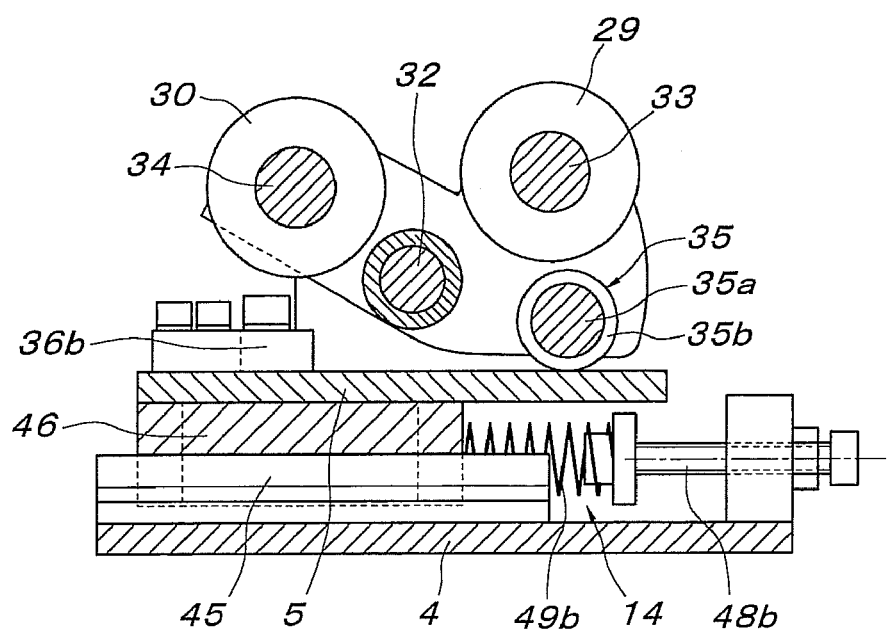
FIG. 12 is a longitudinal sectional side view showing a modification of a movable-table supporting structure.
Figure 13:
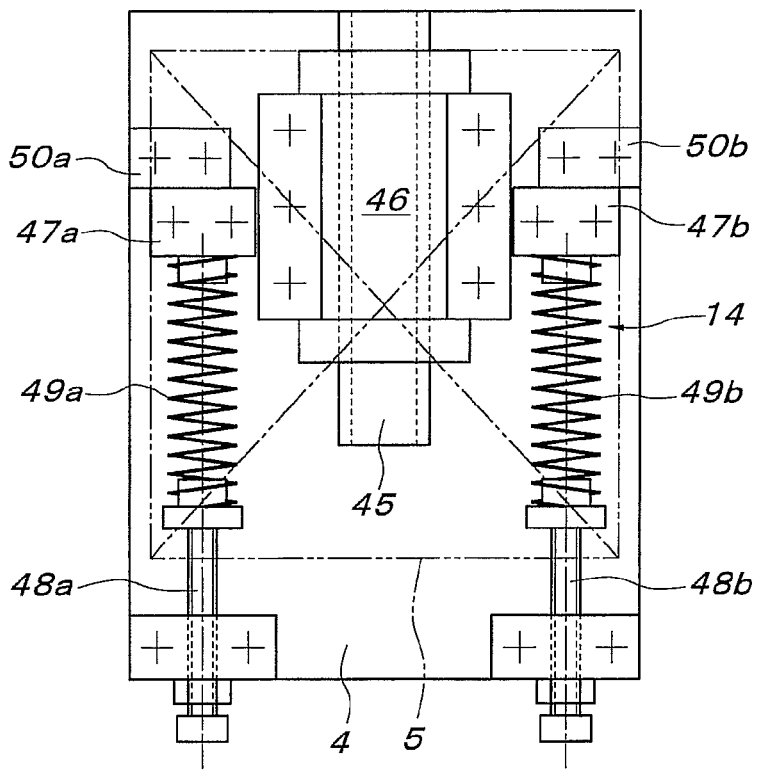
FIG. 13 is a plan view showing a movable-table urging means of the modification of FIG. 12.
Figure 14:
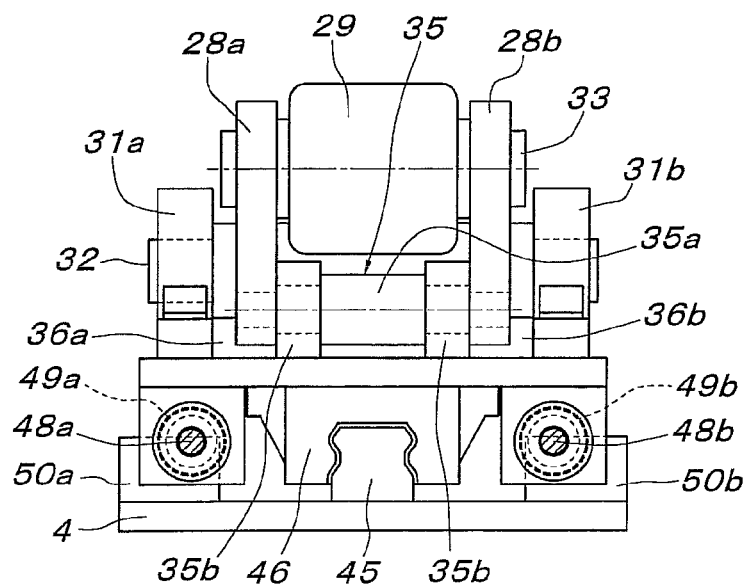
FIG. 14 is a partially longitudinal sectional rear view of the modification.

For example, as shown in FIG. 12 to FIG. 14, the movable table 5 is attached to a slider 46 fitted to a slide guide rail 45, which is disposed on the platform 4 and which extends in the forward and backward directions, so that the slider 46 can slide in the forward and backward directions, and the movable-table urging means 14 is structured by interposing a pair of right and left helical compression springs 49a and 49b in the forward and backward directions between a pair of right and left spring bearing members 47a and 47b attached to the bottom face of the movable table 5 and a pair of right and left spring bearing bolts 48a and 48b attached to the platform 4 in the forward and backward directions. Therefore, the movable table 5 is urged forwardly by the pair of right and left helical compression springs 49a and 49b of the movable-table urging means 14, and is held at the forward limit position where the pair of right and left spring bearing members 47a and 47b on the side of the movable table 5 are brought into contact with the pair of right and left stopper members 50a and 50b erected on the platform 4. The pair of right and left helical compression springs 49a and 49b have an initial compressive stress that can be adjusted by adjusting the positions in the forward and backward directions of the spring bearing bolts 48a and 48b.

According to the above-mentioned structure, the movable table 5 can recede while resisting the force of the pair of right and left helical compression springs 49a and 49b of the movable-table urging means 14, but cannot horizontally move in the lateral, right and left directions. Therefore, in the load positioning apparatuses disposed on both sides in a direction perpendicular to the moving direction of the cassette K moved when a positional deviation is corrected, the cassette K supported by the load supporting roller 30 slides in the axial center direction with respect to this load supporting roller 30, and there is no difference in the other operations between this and the above embodiments.

Additionally, in the above embodiments, the positioning roller 29 adjoins the outward vertical surface of the exterior of the cassette K (i.e., external vertical surface Kx or Ky), and, when a positional deviation of the cassette K is corrected, the positioning roller 29 presses this outward vertical surface (i.e., external vertical surface Kx or Ky) inwardly. However, the vertical surface on the side of the cassette K pressed by the positioning roller 29 in the horizontal, lateral direction is not limited to the outward vertical surface of the exterior of the cassette K.

Figure 15:
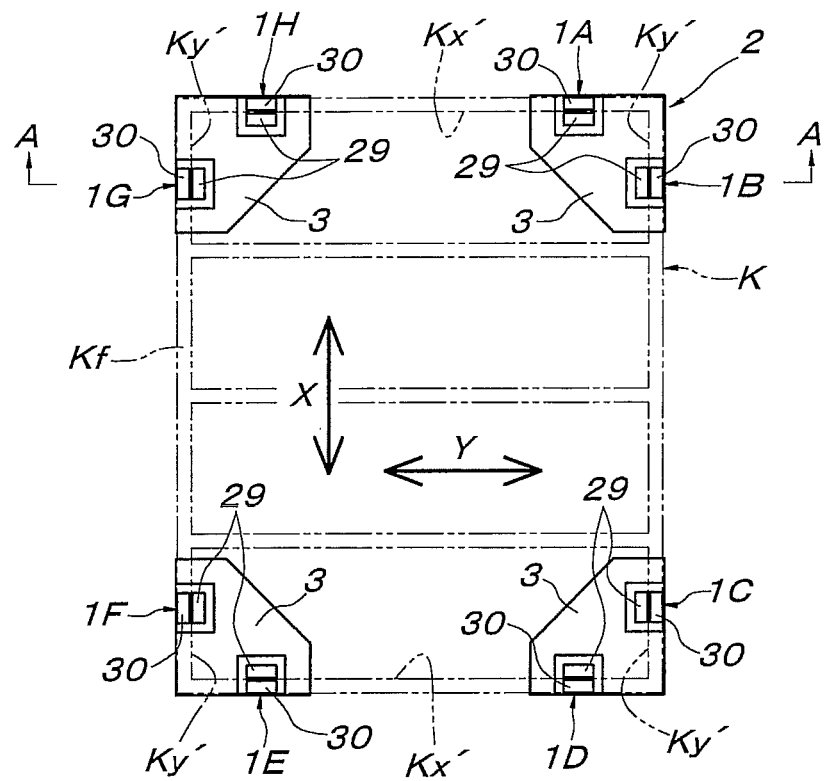
FIG. 15 is a schematic plan view showing still another modification.
Figure 16:
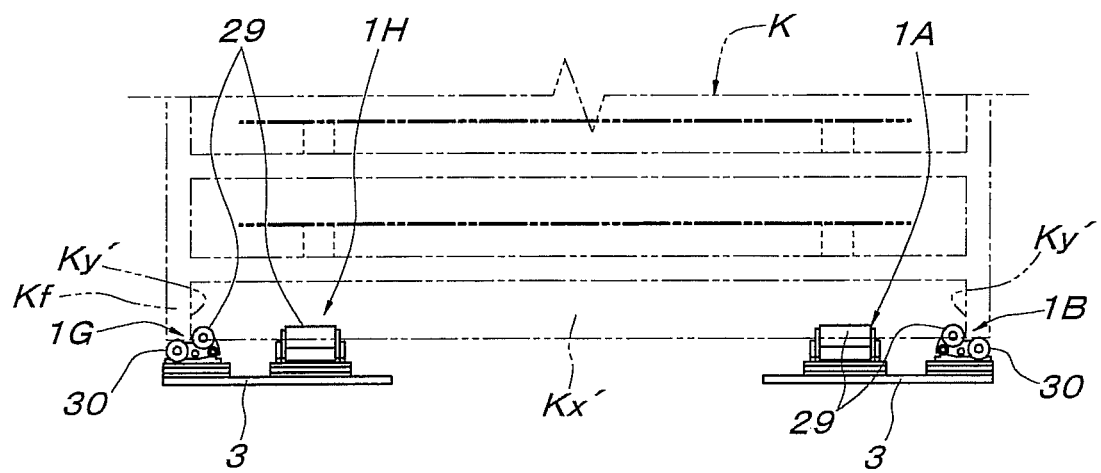
FIG. 16 is an enlarged sectional view along line A-A of FIG. 15.

For example, if the bottom of the cassette K has a frame structure, an outward vertical surface located inside the outward vertical surface of the exterior of the cassette K can be structured to be pressed and moved inwardly by the positioning roller 29, or alternatively, the internal vertical surface Kx' or Ky' of an outer frame Kf of the cassette K can be structured to be pressed and moved outwardly by the positioning roller 29 of each of the load positioning apparatuses 1A to 1H as shown in FIG. 15 and FIG. 16. In this case, the load supporting roller 30 of each of the load positioning apparatuses 1A to 1H supports the bottom face of the outer frame Kf of the cassette K, and the positioning roller 29 thereof enters the inside of the outer frame Kf of the cassette K. According to this structure, there is no need to arrange the positioning roller 29 of each of the load positioning apparatuses 1A to 1H outside the lower area K' of the cassette K, and hence the plane size of the entire cassette supporting table provided with the load positioning apparatuses 1A to 1H can be reduced.

Additionally, the positional deviation of the cassette K in either of the horizontal two-dimensional directions, e.g., in the X direction may be corrected by the load positioning apparatus in which the positioning roller 29 presses and moves the outward vertical surface (external vertical surface Kx or Ky) of the cassette K inwardly, whereas the positional deviation of the cassette K in the Y direction may be corrected by the load positioning apparatus in which the positioning roller 29 presses and moves the internal vertical surface Kx' or Ky' of the cassette K outwardly.

Still additionally, in the above embodiments, the two load positioning apparatuses 1A and 1H and the two load positioning apparatuses 1D and 1E are disposed for the vertical surfaces (Kx and Kx') on both sides in the X direction of the cassette K, respectively. Likewise, the two load positioning apparatuses 1B and 1C and the two load positioning apparatuses 1F and 1G are disposed for the vertical surfaces (Ky and Ky') on both sides in the Y direction of the cassette K, respectively. However, without being limited to this, a single load positioning apparatus and another single load positioning apparatus may be disposed for the vertical surfaces (Kx and Kx') on both sides in the X direction of the cassette K, respectively. Likewise, a single load positioning apparatus and another single load positioning apparatus may be disposed for the vertical surfaces (Ky and Ky') on both sides in the Y direction of the cassette K, respectively.

Figure 17:
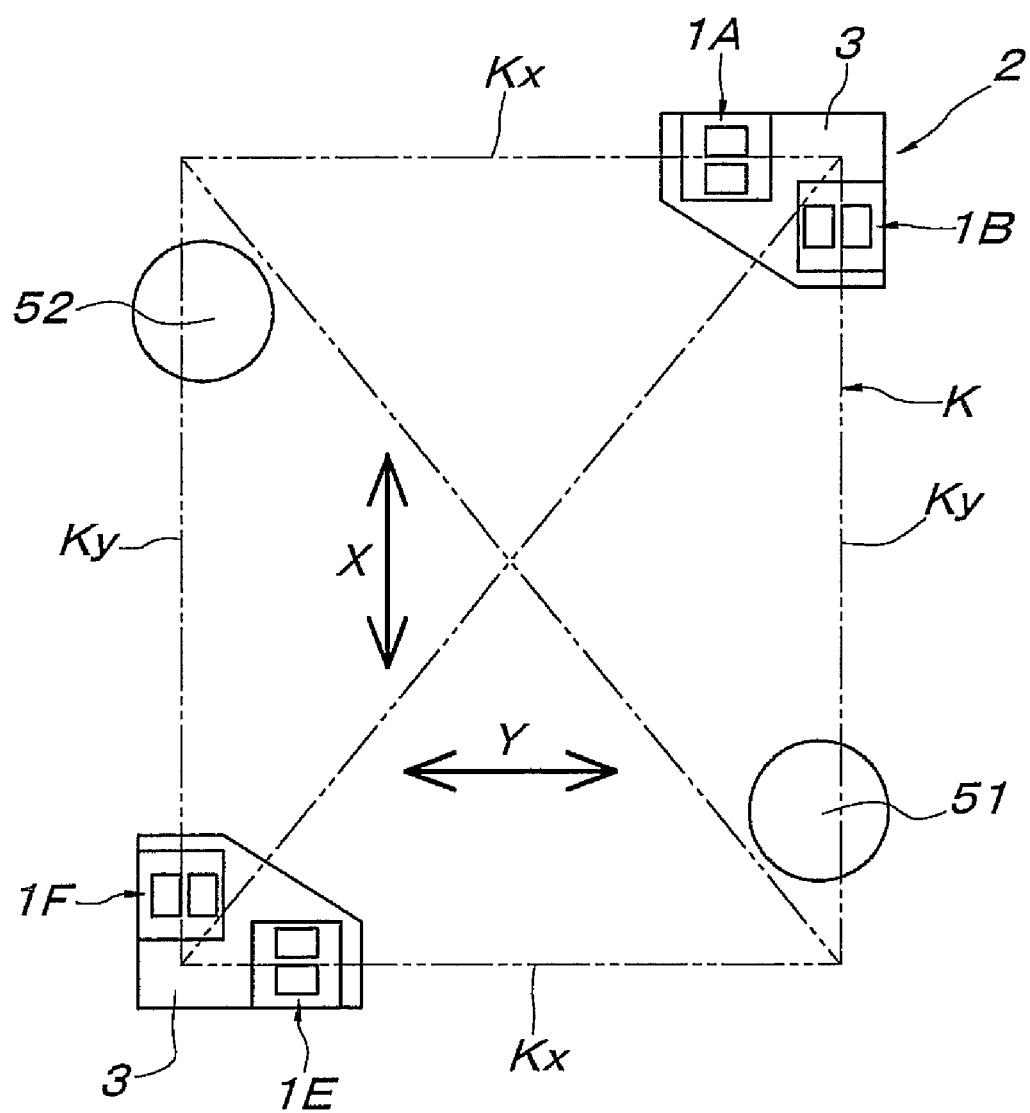
FIG. 17 is a schematic plan view showing another use example of the load positioning apparatus of the present invention.

In more detail, among the load positioning apparatuses consisting of four apparatus groups (1A, 1B), (1C, 1D), (1E, 1F), and (1G, 1H) two apparatuses of which are respectively used for the two right angle surfaces (Kx, Ky or Kx', Ky') of each of the four corner parts of the cassette K shown in FIG. 1 and FIG. 15, two apparatus groups disposed in one diagonal direction of the cassette K (for example, the load positioning apparatuses (1C, 1D) and (1G, 1H)) may be removed, and only the other apparatus groups disposed in the other diagonal direction thereof (for example, the load positioning apparatuses (1A, 1B) and (1E, 1F)) may constitute the cassette-deviation automatic correction apparatus 2. In this case, preferably, supporting means (floating units) 51 and 52 for allowing the cassette K to move in an arbitrary direction on the horizontal surface are disposed near both corner parts in the diagonal direction of the cassette K from which the load positioning apparatuses have been removed, as shown in FIG. 17.

The cassette-deviation automatic correction apparatus 2 made up of the load positioning apparatuses of the present invention can be provided at a cassette transfer position (e.g., substrate-taking-out position) of a stationary place on the ground, for example, on shelves or beside shelves of an automatic warehouse in which cassettes K are stored, or can be provided on a truck used to convey these cassettes K. The load positioning apparatus of the present invention is, of course, not limited to positioning with respect to the cassette K that conveys thin sheet-like substrates, and can be employed as a means for correcting a positional deviation, which is in horizontal two-dimensional directions with respect to a fixed position, of various loads that are vertically lowered by a transfer apparatus and then are supported in the fixed position. The embodiments and modifications shown in the figures can be combined together to form other embodiments.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. An apparatus for automatically correcting a positional deviation of a load lowered vertically by a transfer apparatus relative to both X and Y horizontal, two-dimensional directions, comprising:
    first and second pairs of load positioning apparatuses disposed, respectively, adjacent first and second diagonal corners of the load when the load is in a predetermined position, and each pair of load positioning apparatuses being positioned to meet vertical surfaces of the load in the predetermined position, which vertical surfaces cross at right angles;
    each load positioning apparatus including:
    a load supporting portion that supports a bottom face of the load movably in a horizontal direction;
    a movable table that can translate in horizontal, forward and backward directions within a predetermined range;
    a movable-table urging means for translating the movable table in a horizontal moving direction and for holding the movable table at a forward limit position; and
    a load positioning roller that is supported on the movable table by a horizontal supporting shaft perpendicular to the horizontal moving direction of the movable table;
    each load positioning apparatus is arranged so that the load positioning roller thereof adjoins a vertical surface of the load, when the load is supported in the predetermined position on the load supporting portion and when the movable table is at the forward limit position, and the horizontal moving direction of the movable table being perpendicular to the vertical surface of the load;
    each load positioning apparatus being operable, when the load is lowered in a deviated position wherein the load overlaps the load positioning roller when taking a plan view, to allow the movable table thereof to recede, together with the load positioning roller; and
    the movable-table urging means of each load positioning apparatus being operable, when the load is supported on the load supporting portion, to return the movable table to the forward limit position, together with the load positioning roller.

2. The apparatus of claim 1, wherein the load supporting portion of one load positioning apparatus is disposed on the movable table.

3. The apparatus of claim 2, wherein the load supporting portion of the one load positioning apparatus is formed of a load supporting roller supported by a horizontal shaft perpendicular to forward and backward moving directions of the movable table.

4. The apparatus of claim 3, wherein the one load positioning apparatus further comprises:
    a movable lever;
    a stopper; and
    a movable-lever urging means;
    wherein the movable lever has its intermediate part supported so as to be able to seesaw on the movable table by an operation of a horizontal shaft parallel to the load positioning roller;
    the load positioning roller is supported at an end of the movable lever, and the load supporting roller is supported at an opposite end of the movable lever;
    the stopper restricts a seesawing range of the movable lever between a supporting posture in which the load supporting roller is positioned at a load supporting level and in which the load positioning roller is contiguous to a vertical surface of the load supported at the predetermined position on the load supporting roller and a tilted posture in which the load supporting roller projects from the load supporting level upwardly; and
    the movable-lever urging means urges and holds the movable lever in the tilted posture.

5. The apparatus of claim 2, wherein in the one load positioning apparatus:
    the movable table is supported movably both in horizontal forward and backward directions and in horizontal rightward and leftward directions within a predetermined range, and is provided with a second movable-table urging means for centering the movable table to occupy a center position within a moving range in horizontal, rightward and leftward directions, and
    the second movable-table urging means has such a degree of urging force as to allow the movable table to move in the horizontal, rightward and leftward directions together with the load supported on the load supporting portion.

6. The apparatus of claim 5, wherein in the one load positioning apparatus, the movable-table urging means and the second movable-table urging means are made up of a pair of right and left springs symmetrically obliquely stretched between the movable table and a movable-table supporting board.

7. The apparatus of claim 1, further comprising:
third and fourth pairs of load positioning apparatuses disposed, respectively, adjacent third and fourth diagonal corners of the load when the load is in the predetermined position, and each of the third and fourth pairs of load positioning apparatuses being positioned to meet vertical surfaces of the load in the predetermined position, which vertical surfaces cross at right angles.

8. The apparatus of claim 1, wherein for each load positioning apparatus, when the movable table thereof is in the forward limit position, the load positioning roller adjoins an outside of vertical external surface of the load in the predetermined position.

9. The apparatus for automatically correcting a positional deviation of a load of claim 7, wherein for each load positioning apparatus, when the movable table thereof is in the forward limit position, the load positioning roller adjoins an outside of a vertical external surface of the load in the predetermined position.

10. The apparatus of claim 1, wherein for each load positioning apparatus, when the movable table thereof is in the forward limit position, the load positioning roller adjoins an inside of a vertical internal surface of the load in the predetermined position.

11. The apparatus of claim 7, wherein for each load positioning apparatus, when the movable table thereof is in the forward limit position, the load positioning roller adjoins an inside of vertical internal surface of the load in the predetermined position.

12. The apparatus of claim 1 wherein the movable-table urging means comprises a spring.

13. The apparatus of claim 7 wherein the movable-table urging means comprises a spring.

14. The apparatus of claim 4 wherein the movable-lever urging means comprises a spring.

15. The apparatus of claim 5 wherein the second movable-table urging means comprises a spring.

* * * * *